United States Patent
D'Iallo et al.

(10) Patent No.: US 10,345,494 B2
(45) Date of Patent: Jul. 9, 2019

(54) METHODS OF REDUCING SURFACE ROUGHNESS OF REFLECTANCE COATINGS FOR DUV MIRRORS

(71) Applicant: Corning Incorporated, Corning, NY (US)

(72) Inventors: Michael Joseph D'Iallo, Spencerport, NY (US); Jue Wang, Fairport, NY (US)

(73) Assignee: Corning Incorporated, Corning, NY (US)

( * ) Notice: Subject to any disclaimer, the term of this patent is extended or adjusted under 35 U.S.C. 154(b) by 91 days.

(21) Appl. No.: 15/649,736

(22) Filed: Jul. 14, 2017

(65) Prior Publication Data

US 2018/0017719 A1    Jan. 18, 2018

Related U.S. Application Data (60) Provisional application No. 62/362,205, filed on Jul. 14, 2016.

(51) Int. Cl.
  *G02B 1/14*     (2015.01)
  *G02B 5/08*     (2006.01)

(52) U.S. Cl.
  CPC ............. *G02B 5/0833* (2013.01); *G02B 1/14* (2015.01); *G02B 5/0891* (2013.01)

(58) Field of Classification Search
  None
  See application file for complete search history.

(56) References Cited

U.S. PATENT DOCUMENTS

| 5,958,605 A | 9/1999 | Montclam et al. |
| 6,110,392 A | 8/2000 | Kerber et al. |
| 7,115,530 B2 | 10/2006 | Quevedo-Lopez et al. |
| 7,919,004 B2 | 4/2011 | Weiser et al. |

(Continued)

FOREIGN PATENT DOCUMENTS

| EP | 2511944 A1 | 10/2012 |
| KR | 2013023012 A | 3/2013 |

(Continued)

OTHER PUBLICATIONS

International Search Report and Written Opinion PCT/US2017/041845 dated Feb. 14, 2018.

(Continued)

*Primary Examiner* — Derek S. Chapel
(74) *Attorney, Agent, or Firm* — Smit Kapadia; Svetlana Z. Short (57) ABSTRACT

A method of reducing surface roughness of DUV reflectance coatings for a DUV mirror to improve the reflectance of the DUV mirror includes: forming the reflectance coating on a substrate, the reflectance coating including a film stack comprising multiple dielectric layers, including an uppermost layer. The method also includes adding to the uppermost layer a cap layer comprising $SiO_2$ and having an upper surface with an initial RMS amount of surface roughness. The method further includes adding a sacrificial layer to the upper surface of the cap layer, wherein the sacrificial layer comprises $SiO_2$. The method also includes etching the sacrificial layer down to the cap layer so that the upper surface of the cap layer has a final RMS amount of surface roughness that is less than the initial amount of surface roughness.

27 Claims, 7 Drawing Sheets

(56) References Cited

U.S. PATENT DOCUMENTS

| | | |
|---|---|---|
| 7,961,383 B2 | 6/2011 | Wang et al. |
| 8,153,241 B2 | 4/2012 | Schreiber et al. |
| 8,158,468 B2 | 4/2012 | Masuoka et al. |
| 8,178,399 B1 | 5/2012 | Masuoka et al. |
| 8,241,976 B2 | 8/2012 | Masuoka et al. |
| 8,313,663 B2 | 11/2012 | Hautala |
| 8,395,208 B2 | 3/2013 | Masuoka et al. |
| 8,399,110 B2 | 3/2013 | Cangemi et al. |
| 8,950,215 B2 | 2/2015 | Rappoport et al. |
| 9,297,936 B2 | 3/2016 | Erxmeyer et al. |
| 2004/0258192 A1 | 12/2004 | Angeliu et al. |
| 2007/0119713 A1 | 5/2007 | Hasz |
| 2007/0281109 A1 | 12/2007 | Bijkerk et al. |
| 2008/0311762 A1 | 12/2008 | Doczy |
| 2009/0110903 A1 | 4/2009 | Margolies |
| 2010/0215932 A1 | 8/2010 | Schreiber et al. |
| 2013/0077044 A1 | 3/2013 | De Juan, Jr. et al. |
| 2013/0207004 A1 | 8/2013 | Ceglio et al. |
| 2013/0207007 A1 | 8/2013 | Tanabe |
| 2015/0219805 A1 | 8/2015 | Schreiber et al. |
| 2016/0011344 A1 | 1/2016 | Beasley et al. |

FOREIGN PATENT DOCUMENTS

| | | |
|---|---|---|
| KR | 2013053602 A | 5/2013 |
| KR | 2013083420 A | 7/2013 |

OTHER PUBLICATIONS

Invitation to Pay Additional Fees; PCT/US2017/041845; Mailed October 18, 2017; 13 Pages; European Patent Office.

Bischoff et al; "Plasma-Assisted Deposition of Metal Fluoride Coatings and Modeling the Extinction Coefficient of as-Deposited Single Layers"; Applied Optics, vol. 50, No. 9; March 20, 2011 p. C232-C238.

Blaschke et al; "Exposure of High-Reflecting Fluoride Coatings Under High Fluence Conditions at 193NM"; Proc. of SPIE, vol. 7842, p. 78420I-1-78420I-8.

Ode; "Ion Beam Sputtering of Fluoride Thin Films for 193 NM Applications"; Applied Optics, vol. 53, No. 4, Feb. 1, 2014; p. A330-A333.

METHODS OF REDUCING SURFACE ROUGHNESS OF REFLECTANCE COATINGS FOR DUV MIRRORS

This application claims the benefit of priority under 35 U.S.C. § 119 of U.S. Provisional Application Ser. No. 62/362,205 filed on Jul. 14, 2016, the content of which is relied upon and incorporated herein by reference in its entirety.

FIELD

The present disclosure relates to reflectance coatings for optical components and in particular to reflectance coatings for deep ultraviolet (DUV) optics and more particularly to methods of reducing surface roughness of reflectance coatings for DUV mirrors.

BACKGROUND

DUV optical systems often employ DUV mirrors because refractive optical elements have a relatively low optical transmittance at DUV wavelengths (e.g., 190 nm to 280 nm). However, most optical materials used to form DUV mirrors do not have a sufficiently high reflectance at DUV wavelengths and thus require a reflectance coating.

A typical reflectance coating is formed from a stack of alternating layers of dielectric materials whose number, thickness and refractive index are selected to optimize reflectivity over a select wavelength band with a select center wavelength.

While the multilayer stack can be designed to provide a theoretical reflectance of 100%, variations in the fabricated film stack can act to reduce the reflectivity. These variations include surface roughness of the substrate, of the interface between the layers, and of the uppermost layer. Surface roughness causes light scattering, which in turn reduces the reflectance. This reduction in reflectance can be particularly problematic with DUV mirrors, which often require a reflectance of greater than 99%.

SUMMARY

An aspect of the disclosure is a method of improving a reflectance of a DUV reflectance coating. The method includes: a) forming the reflectance coating on a substrate, the reflectance coating including a film stack comprising multiple dielectric layers, including an uppermost dielectric layer; b) adding to the uppermost dielectric layer of the film stack a cap layer comprising silicon dioxide ($SiO_2$), wherein the cap layer has an upper surface with an initial root-mean-square (RMS) amount of surface roughness $SR_0$; c) adding a sacrificial layer to the upper surface of the cap layer, wherein the sacrificial layer comprises $SiO_2$; and d) etching the sacrificial layer down to the cap layer without substantially reducing the thickness of the cap layer so that the upper surface of the cap layer has a final RMS amount of surface roughness $SR_F$ that is less than the initial amount of surface roughness $SR_0$.

The above method can include the further act e) of repeating acts c) and d) so that the final RMS amount of surface roughness $SR_F$ is at least 10% smaller than the initial RMS amount of surface roughness $SR_0$.

The above method can also include repeating acts c) and d) so that the final RMS amount of surface roughness $SR_F$ is at least 20% smaller than the initial RMS amount of surface roughness $SR_0$.

The above method can also include repeating acts c) and d) between 5 and 10 times.

The above method can include plasma etching with a plasma that contains oxygen radicals.

The above method can also include the cap layer and the sacrificial layer each comprise of either $SiO_2$ or doped $SiO_2$.

The above method can also include the cap layer and the sacrificial layer each consisting of either $SiO_2$ or doped $SiO_2$.

The above method can also include the one or more of the dielectric layers of the multiple dielectric layers including fluoride.

The above method can also include the multiple dielectric layers being made of materials layers selected from the group of materials comprising: aluminum fluoride, gadolinium fluoride, magnesium fluoride, lanthanum fluoride, silicon dioxide and aluminum dioxide.

The above method can also include the film stack residing upon a base film stack that resides immediately adjacent the substrate and formed from alternating layers of aluminum oxide and silicon dioxide.

The above method can also include the silicon dioxide cap layer having a thickness in the range from 55 nm to 70 nm.

The above method can also include the substrate being made of silicon dioxide.

The above method can also include the cap layer being deposited at a first deposition rate and the sacrificial layer being deposited at a second deposition rate that is slower than the first deposition rate by at least 5%.

The above method can also include the first deposition rate being 0.25 nm/s and the second deposition rate being 0.15 nm/s.

The above method can also include the reflectance coating after performing the act b) having a reflectance R<99% and the reflectance coating after performing the acts c) and d) one or more times having a reflectance R>99%.

The above method can also include the reflectance of the reflectance coating being optimized over a wavelength band that includes at least one of the following wavelengths: 193 nm, 213 nm and 266 nm.

Another aspect of the disclosure is a method of improving a reflectance of a DUV reflectance coating. The method includes: a) forming the reflectance coating on a substrate, the reflectance coating including a film stack comprising multiple dielectric layers, including an uppermost layer; b) adding to the uppermost layer of the film stack a cap layer comprising either silicon dioxide or doped silicon dioxide, wherein the cap layer has an upper surface with an initial root-mean-square (RMS) amount of surface roughness $SR_0$; c) adding a sacrificial layer to the upper surface of the cap layer, wherein the sacrificial layer comprises of the same material(s) as the cap layer; d) plasma etching the sacrificial layer with a plasma containing oxygen radicals down to the cap layer; and e) performing acts c) and d) multiple times until the upper surface of the cap layer has a final RMS amount of surface roughness $SR_F$ that is less than the initial RMS amount of surface roughness $SR_F$ by at least 10%.

Another aspect of the disclosure is a method of improving a reflectance of a DUV reflectance coating. The method includes: a) forming the reflectance coating on a substrate, the reflectance coating including a film stack comprising multiple dielectric layers, including an uppermost layer; b) adding to the uppermost layer of the film stack a cap layer consisting of either silicon dioxide or doped silicon dioxide, wherein the cap layer has an upper surface with an initial root-mean-square (RMS) amount of surface roughness $SR_0$; c) adding a sacrificial layer to the upper surface of the cap layer, wherein the sacrificial layer consists of the same material as the cap layer; d) plasma etching the sacrificial layer with a plasma containing oxygen radicals down to the cap layer; and e) performing acts c) and d) multiple times until the upper surface of the cap layer has a final RMS amount of surface roughness $SR_F$ that is less than the initial RMS amount of surface roughness $SR_F$ by at least 10%.

The above method can include depositing the cap layer at a first deposition rate and depositing the sacrificial layer at a second deposition rate that is slower than the first deposition rate by at least 5%.

The above method can include the feature of where at least one of the multiple dielectric layers includes fluoride.

The above method can also include the multiple dielectric layers being made of materials selected from the group of materials comprising: aluminum fluoride, gadolinium fluoride, magnesium fluoride, lanthanum fluoride, silicon dioxide and aluminum oxide.

The above method can also include the reflectance coating after performing the act b) having a reflectance R<99% and the reflectance coating after performing act e) having a reflectance of R>99%.

Another aspect of the disclosure is a method of improving a reflectance of a DUV reflectance coating. The method includes: a) forming the reflectance coating on a substrate, the reflectance coating including a film stack comprising multiple dielectric layers, including an uppermost dielectric layer; b) adding to the uppermost dielectric layer of the film stack a dielectric cap layer having an upper surface with an initial root-mean-square (RMS) amount of surface roughness $SR_0$; c) adding a sacrificial layer to the upper surface of the cap layer, wherein the sacrificial layer is made of the same material as the dielectric cap layer; and d) etching the sacrificial layer down to the cap layer without substantially reducing the thickness of the cap layer so that the upper surface of the cap layer has a final RMS amount of surface roughness $SR_F$ that is less than the initial amount of surface roughness $SR_0$.

The above method can also include the feature that the material that makes up the dielectric cap layer and the sacrificial layer comprises of either silicon dioxide or doped silicon dioxide.

The above method can also include the feature that the material that makes up the dielectric cap layer and the sacrificial layer comprise either silicon dioxide or doped silicon dioxide. The above method can also include the feature that the material that makes up the dielectric cap layer and the sacrificial layer consists of either silicon dioxide or doped silicon dioxide.

The above method can also include repeating acts c) and d) so that the final RMS amount of surface roughness $SR_F$ is at least 10% smaller than the initial RMS amount of surface roughness $SR_0$.

The above method can also include repeating acts c) and d) so that the final RMS amount of surface roughness $SR_F$ is at least 20% smaller than the initial RMS amount of surface roughness $SR_0$.

The above method can also include repeating acts c) and d) between 5 and 10 times.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description serve to explain principles and operation of the various embodiments. As such, the disclosure will become more fully understood from the following Detailed Description, taken in conjunction with the accompanying Figures, in which.

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description.

Cartesian coordinates are shown in some of the Figures for the sake of reference and are not intended to be limiting as to direction or orientation.

The terms "method" and "process" are used interchangeably herein.

In the discussion below, the terms "final cap layer" and "final upper surface" are used to describe the resulting cap layer and resulting upper surface, respectively, when the methods described herein are carried out to completion. Thus, the word "final" in this context does not relate to a physical position of the cap layer or the upper surface relative to the underlying film stack but rather to the result of the last or "final" step in the process of reducing surface roughness as described in detail below.

Figure 1:
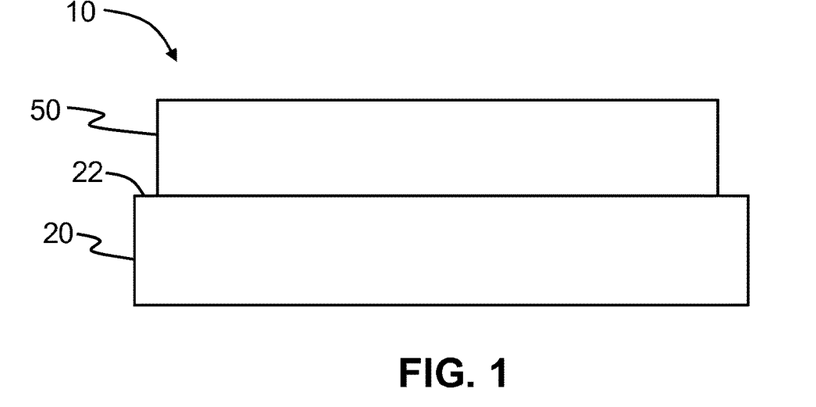
FIG. 1 is a schematic diagram of an example DUV mirror having a reflectance coating formed on a mirror substrate.

FIG. 1 is a schematic diagram of a DUV mirror 10 that includes a substrate 20 with an upper surface 22 and a reflectance coating 50 formed on the substrate upper surface. In an example, upper surface 22 of substrate 20 is curved while in another example it is flat, as shown for ease of illustration.

Figure 2:
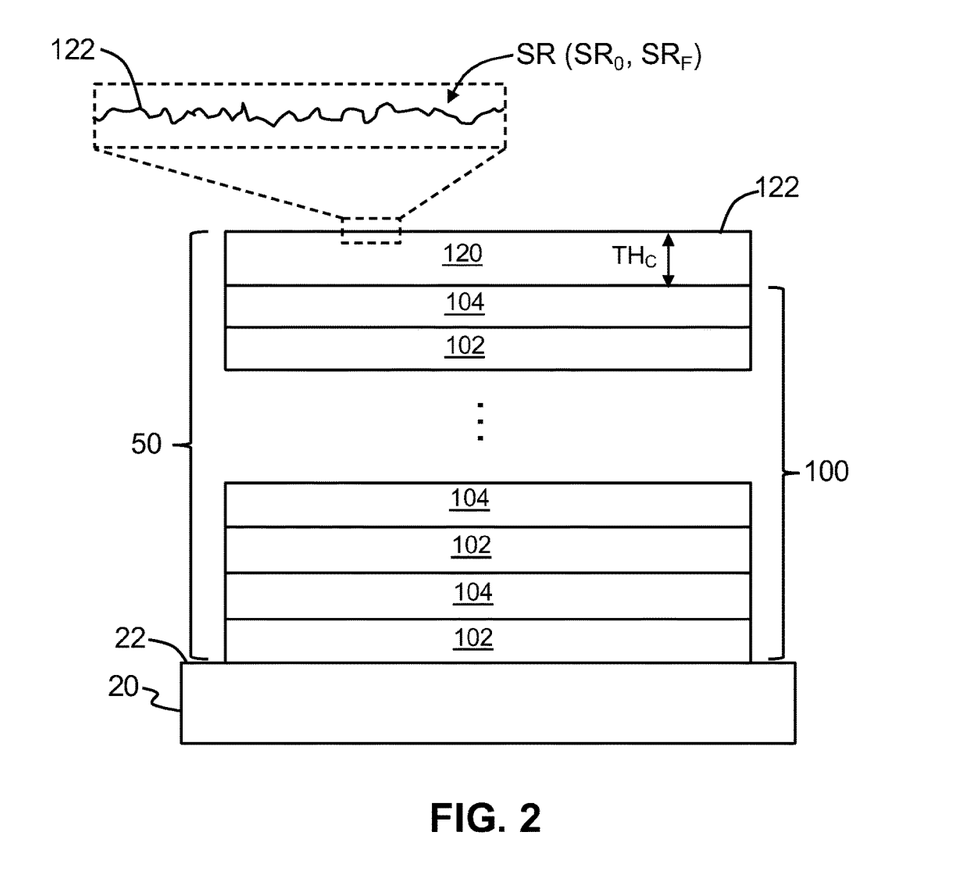
FIG. 2 is a schematic diagram of the DUV mirror of FIG. 1 showing the reflectance coating as formed from a multi-layer stack and a cap layer, and showing in the close-up inset the upper surface of the cap layer having an amount of surface roughness.

FIG. 2 is a schematic diagram of DUV mirror 10 showing more detail of reflectance coating 50. The reflectance coating 50 is made up of at least one multi-layer film stack ("stack") 100 and a cap layer 120 formed on top of the stack. The stack 100 includes alternating dielectric layers 102 and 104, with each pair of dielectric layers defining one "period." In an example, the dielectric layers 102 and 104 are made of materials selected from the group of materials comprising: aluminum fluoride, gadolinium fluoride, magnesium fluoride, lanthanum fluoride, silicon dioxide and aluminum oxide. In an example, at least one of dielectric layers 102 and 104 contains fluoride.

The cap layer 120 has an upper surface 122 with a surface roughness SR, which in an example is measured as a root-mean-square (RMS) value, as is commonly done in the art. The cap layer 120 is used to protect the dielectric layers 102 and 104 from the environment in which DUV mirror may be used. For example, cap layer 120 can be used to prevent moisture from adversely affecting the dielectric layers 102 and 104. In an example, cap layer 120 is not a "functional" layer, i.e., it is configured to not substantially change the designed reflectance of the reflectance coating 50 based on interference effects as defined by the underlying dielectric layers 102 and 104.

The cap layer 120 has a physical thickness $TH_C$ that defines an "optical thickness" or optical path length $OPL=(TH_C) \cdot n_C$, where $n_C$ is the refractive index of the material making up the cap layer at wavelength $\lambda$, usually the center wavelength $\lambda_0$. In an example of obtaining an optimal reflectance, the OPL is designed to be a multiple of a "half-wave," i.e., $OPL=(TH_C) \cdot n_C = m \cdot \lambda_0/2$, where m is an integer. Thus, in an example, the physical thickness of cap layer is $TH_C=(m \cdot \lambda_0)/(2 \cdot n_C)$.

In an example, cap layer 120 comprises $SiO_2$, e.g., the cap layer 120 can consist of pure $SiO_2$ or can consist of doped $SiO_2$, e.g., fluorine-doped $SiO_2$ ($F-SiO_2$). In an example, the thickness $TH_C$ of cap layer 120 is in the range from 55 nm to 75 nm, and further in an example, the thickness $TH_C$ is within this range subject to the above-described half-wave requirement for the OPL.

The reflectance coating 50 has an initial reflectance $R_0$ over a select wavelength band $\Delta\lambda$ that includes at least one DUV wavelength $\lambda_0$, which in example is a center wavelength of the wavelength band. Example DUV wavelengths $\lambda_0$ can fall within the range from 193 nm to 266 nm and so can include 193 nm, 213 nm and 266 nm, as well as other wavelengths within the range.

In an example, the initial reflectance $R_0<99\%$, e.g., 98.5% or 98%. This initial reflectance $R_0$ is less than the theoretical reflectance $R_T$ based on the design of reflectance coating 50. This difference is due to the aforementioned manufacturing shortcomings when forming reflectance coating 50, including in particular the surface roughness SR of cap layer 120.

Figure 3:
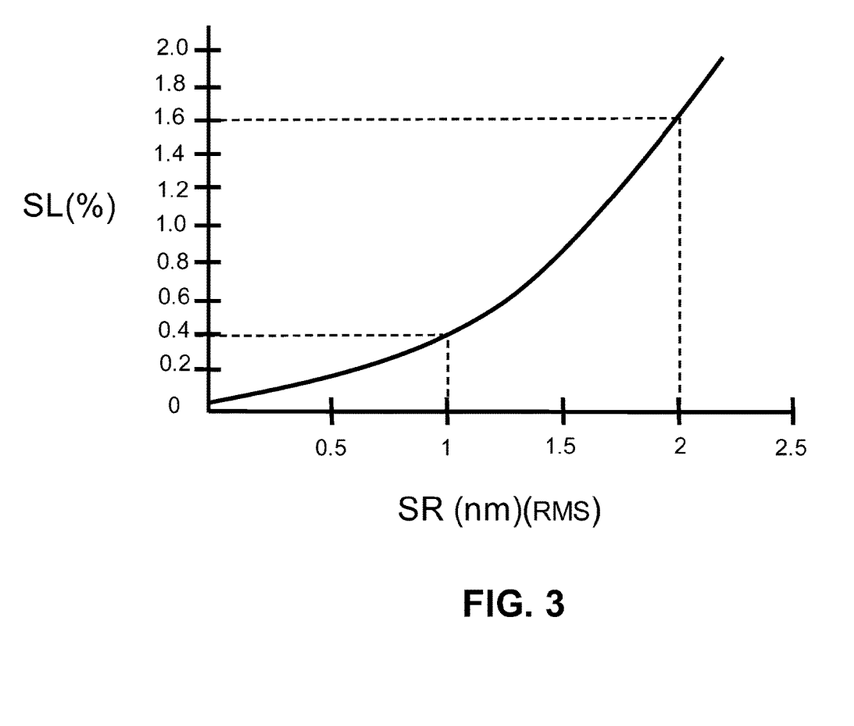
FIG. 3 is a plot of the scattering loss SL (%) versus the RMS surface roughness SR (nm) for an example DUV mirror designed to operate at a DUV wavelength $\lambda_0$ of 193 nm.

The initial reflectance $R_0$ is defined in part by upper surface 122 of cap layer 120 having an initial amount of surface roughness $SR_0$ as defined when the cap layer 120 is first formed atop the underlying stack 100. FIG. 3 is a plot if the scattering loss SL (%) versus the RMS surface roughness SR (nm) for an example mirror designed to operate at a DUV wavelength $\lambda_0$ of 193 nm. The plot of FIG. 3 shows that a 2 nm RMS surface roughness SR reduces the overall reflectance of the DUV mirror by 1.6%. Thus, for a DUV mirror designed with a theoretical reflectance of 100%, the actual reflectance in practice will be no more than 98.4%, which is unacceptable for many DUV mirror applications that require at least 99% reflectance. On the other hand, a reduction in the surface roughness SR from 2 nm RMS to 1 nm RMS leads to a scatter loss of 0.4%, or a 4× improvement in the reflectance, thereby making a reflectance of >99% achievable.

Figure 4A:
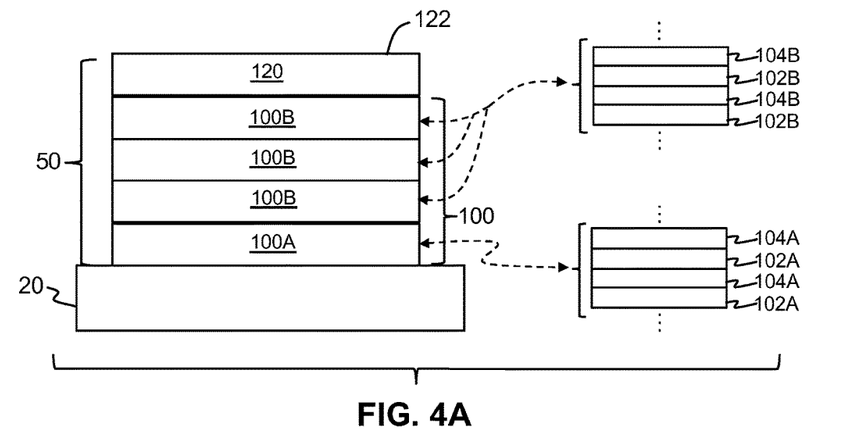
FIG. 4A is similar to FIG. 2 and shows an example reflectance coating that includes four multilayer film stacks topped off by a cap layer.

The reflectance coating 50 can include one or more multilayer stacks 100. FIG. 4A is similar to FIG. 2 and shows an example reflectance coating 50 that includes four multi-layer film stacks ("stacks") 100: a first stack 100A closest to substrate 20 followed by three stacks 100B. The multi-layer film stack 100A resides immediately adjacent substrate 22 and can include multiple (e.g., between 12 and 20) pairs (periods) of alternating layers 102A and 104A of aluminum oxide ($Al_2O_3$) and silicon dioxide ($SiO_2$), respectively. The three multi-layer film stacks 100B reside immediately atop stack 100A and each includes multiple (e.g., between three and seven) pairs (periods) of alternating layers 102B and 104B of low-index and high-index fluoride materials. In an example, these fluorides are selected from the group of materials comprising: aluminum fluoride gadolinium fluoride, magnesium fluoride and lanthanum fluoride. The reflectance layer 50 also includes a cap layer 120B comprising $SiO_2$.

Figure 4B:
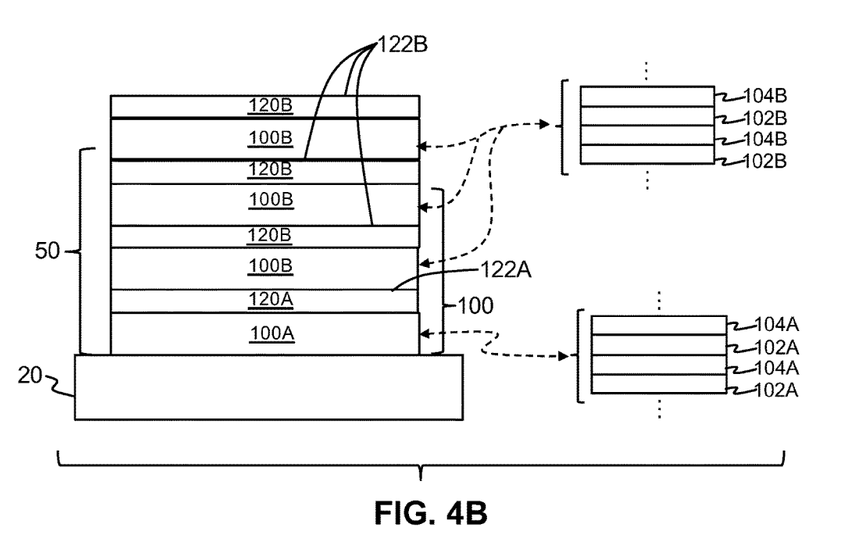
FIG. 4B is similar to FIG. 4A and shows the four multilayer film stacks as each including an internal cap layers in addition to an external cap layer on the uppermost multilayer film stack.

FIG. 4B is similar to FIG. 4A and illustrates an example where each stack 100 is topped off by a cap layer 120, i.e., stack 100A is topped off by a cap layer 120A having an upper surface 122A and stacks 100B are each topped off by a corresponding cap layer 120B having an upper surface 122B. A cap layer 120 that resides within reflectance coating 50 is referred to herein as an internal cap layer, while the cap layer that tops off the uppermost stack 100 is referred to as an external cap layer. Unless otherwise designated, in the discussion herein, cap layer 120 is assumed to be an external cap layer.

Figure 5A:
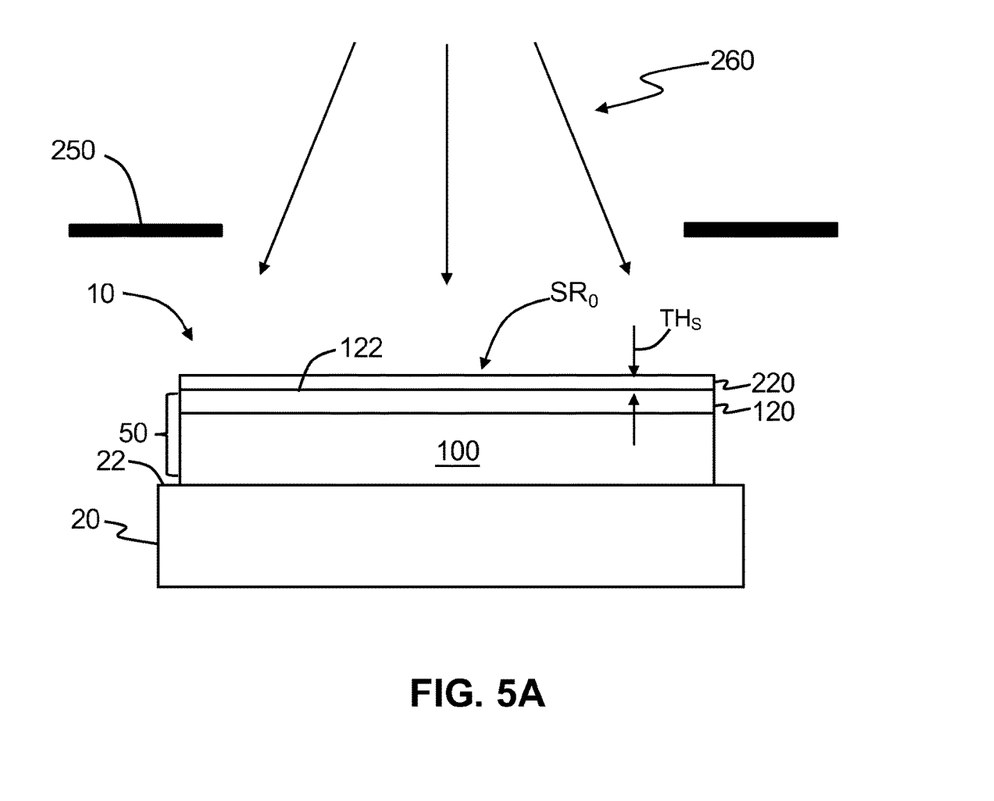
FIG. 5A is similar to FIG. 1 and illustrates an example of the formation of a sacrificial layer on the upper surface of the cap layer.

FIG. 5A is similar to FIG. 1 and illustrates the formation of a sacrificial layer 220 formed on upper surface 122 of cap layer 120. In example, this is accomplished using a reversed mask 250 and a plasma-assisted deposition process 260, such as described in U.S. Pat. No. 7,465,681, which is incorporated by reference herein. In an example, sacrificial layer 220 has a thickness $TH_S$ in the range from 4 nm to 20 nm, with 5 nm being an exemplary thickness. In an example, sacrificial layer 200 comprises the same material that constitutes cap layer 120. In an example, sacrificial layer 200 consists of the same material(s) that constitutes cap layer 120.

Also in an example, cap layer 120 is deposited at a first deposition rate $DR_1$ and the sacrificial layer 220 is deposited at a second deposition rate $DR_2$ that is slower than the first deposition rate $DR_1$. In an example, the second deposition rate $DR_2$ is between 5% and 60% slower than the first deposition rate $DR_1$, while in another example the second deposition rate $DR_2$ is between 10% and 50% slower than the first deposition rate $DR_1$, while in another example the second deposition rate $DR_2$ is between 20% and 50% slower than the first deposition rate $DR_1$. In an example, the first deposition rate $DR_1$ is in the range from 0.2 nm/s to 0.3 nm/s and the second deposition rate is in the range from 0.1 nm/s to 0.2 nm/s $DR_2$, subject to the condition that $DR_2 < DR_1$, and preferably subject to the condition that $DR_2 < (0.95) \cdot DR_1$ or $DR_2 < (0.9) \cdot DR_1$ or $DR_2 < (0.80) \cdot DR_1$. For example, the first deposition rate can be 0.25 nm/s while the second deposition rate can be 0.15 nm/s.

Figure 5B:
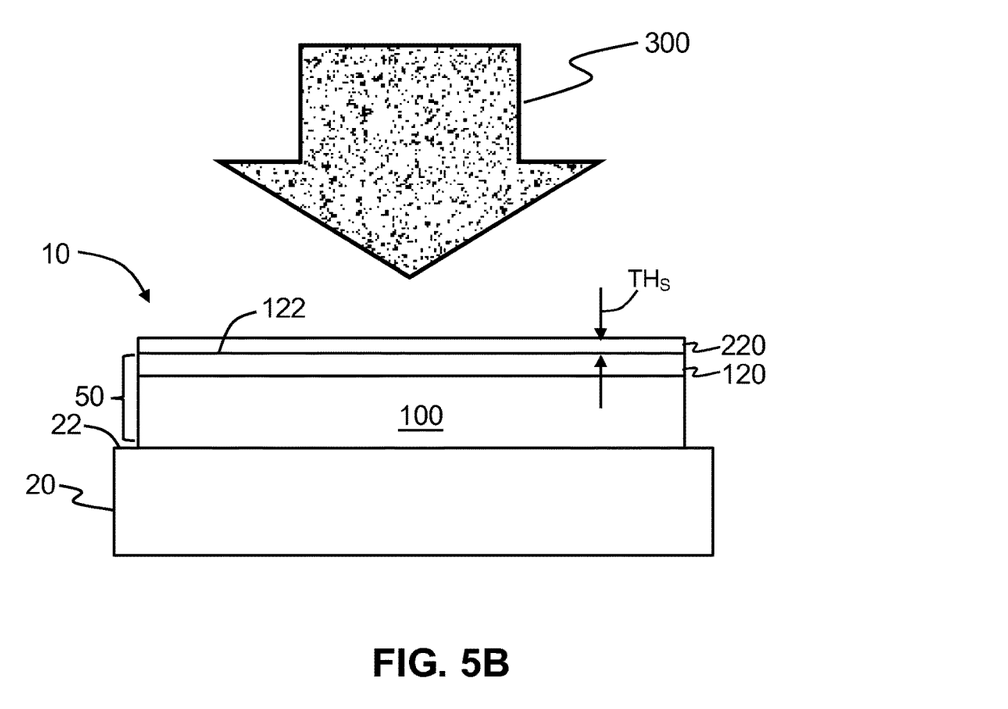
FIGS. 5B and 5C are similar to FIG. 5A and illustrate the removal of the sacrificial layer from the cap layer by plasma etching to form a processed cap layer.
Figure 5C:
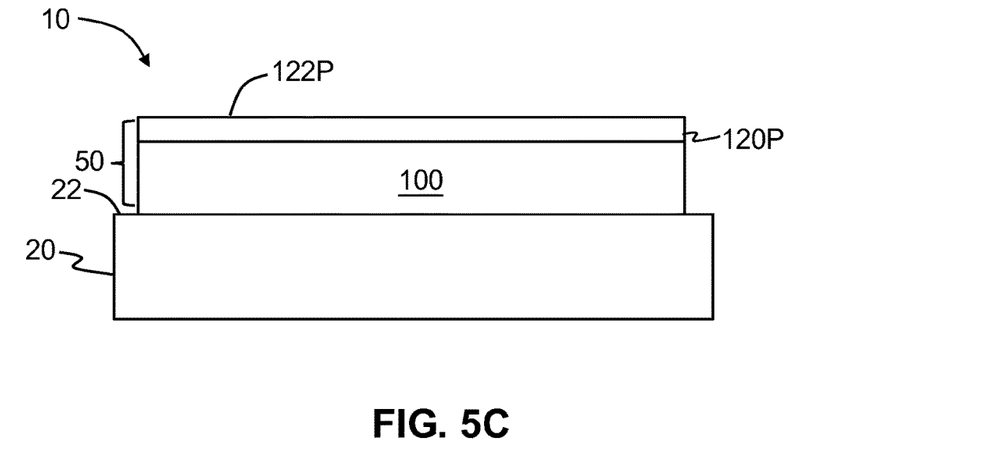

The next step in the method involves removing sacrificial layer 220 from cap layer 120. FIGS. 5B and 5C are similar to FIG. 5A and illustrate an example wherein the removal of sacrificial layer 220 is accomplished by etching using a plasma 300. In an example, sacrificial layer 220 comprises $SiO_2$ and plasma 300 includes oxygen radicals O* to assist in maintaining the stoichiometry of the $SiO_2$ cap layer 120. An example plasma 300 suitable for the plasma-etch process is an argon-oxygen plasma.

In an example, the removal of sacrificial layer 220 from cap layer 120 is preferably carried out in a manner that does not leave behind any substantial amount of the sacrificial layer and that does not remove any substantial amount of cap layer 120. In other words, there can be some amount of sacrificial layer 200 remaining and/or there can be some amount of material removed from cap layer 120 so long as the functionality of cap layer 120 and the overall performance of reflectance coating 50 is not substantially adversely affected. In an example, an adverse effect is not considered substantial when it results in a reduction in the reflectance of 0.1% or less. In an example, small amounts of material from sacrificial layer 220 may remain on upper surface 122 of cap layer 120 and fill in the valleys defined by surface roughness, thereby reducing the amount of surface roughness without substantially changing the overall thickness $TH_C$ of cap layer 120.

The cap layer 120 and its upper surface 122 are respectively denoted 120P and 122P in FIG. 5C to indicate that the upper surface has been processed by the deposition and subsequent removal of sacrificial layer 220.

Figure 5D:
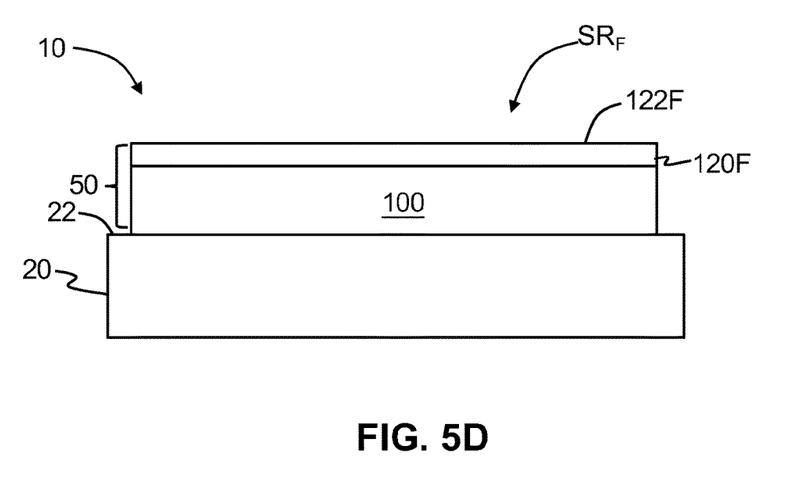
FIG. 5D shows the DUV mirror with a final cap layer having a final upper surface that has a final amount of surface roughness that is less than the initial amount of surface roughness of the initial cap layer on which the initial sacrificial layer is formed (FIG. 5A)

In an example, the acts of depositing sacrificial layer 220 on cap layer 120 and then removing the sacrificial layer illustrated in FIGS. 5A through 5C are performed multiple times, e.g., 2 times or more, or 3 or more times, or 4 or more times, or 5 times or more, and in an example up to 10 times, to generate to generate a final processed cap layer ("final cap layer") 120F (FIG. 5D). Each repetition of the addition and removal of sacrificial layer is referred to as an iteration or a cycle.

FIG. 5D shows DUV mirror 10 with a final cap layer 120F with a final upper surface 122F that has a final amount of surface roughness $SR_F$ that is less than the initial amount of surface roughness $SR_0$. In an example where only single iteration or cycle is performed, then the processed upper surface 122P is the same as the final upper surface 122F. In examples where multiple iterations or cycles are performed, the processed upper surface 122P represents an intermediate state of the upper surface.

In an example where the surface roughness SR is expressed as an RMS value, the final RMS amount of surface roughness $SR_F$ for cap layer upper surface 122F is at least 5% less than the initial RMS amount of surface roughness $SR_0$ of the cap layer 120. In another example, the final RMS amount of surface roughness $SR_F$ for cap layer upper surface 122F is at least 10% less than the initial RMS amount of surface roughness $SR_0$ of the initial cap layer 120. In another example, the final RMS amount of surface roughness $SR_F$ for cap layer upper surface 122F is at least 20% less than the initial RMS amount of surface roughness $SR_0$ of the initial cap layer 120. In another example, the final RMS amount of surface roughness $SR_F$ for cap layer upper surface 122F is at least 25% less than the initial RMS amount of surface roughness $SR_0$ of the initial cap layer 120. In another example, the final RMS amount of surface roughness $SR_F$ for cap layer upper surface 122F is at least 30% less than the initial RMS amount of surface roughness $SR_0$ of the initial cap layer 120. In another example, the final RMS amount of surface roughness $SR_F$ for cap layer upper surface 122F is at least 40% less than the initial RMS amount of surface roughness $SR_0$ of the initial cap layer 120.

In an example where the initial reflectance $R_0 < 99\%$, after processing cap layer 120 using the method described above to reduce the cap layer surface roughness, the reflectance coating has a final reflectance $R_F > 99\%$.

Figure 6:
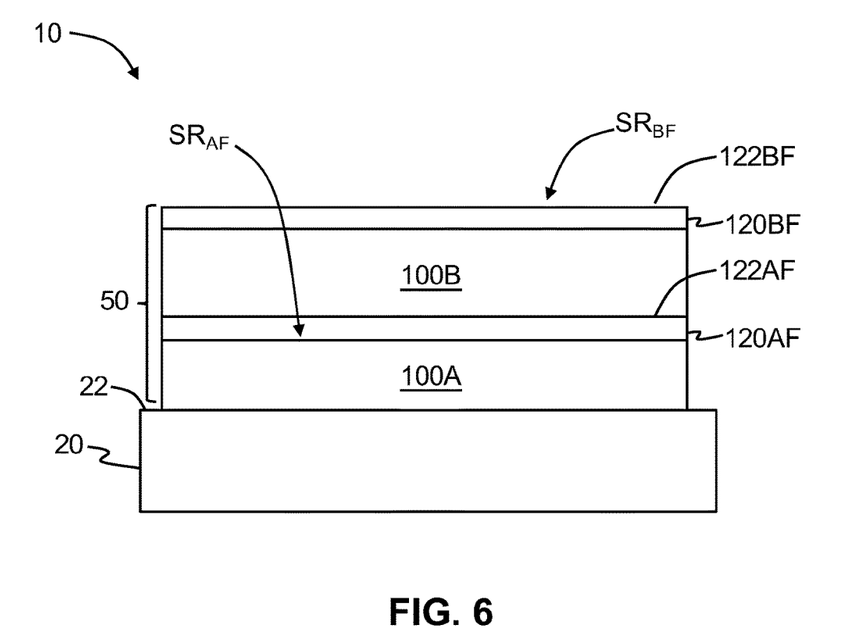
FIG. 6 is similar to FIG. 5C and shows an example DUV mirror wherein the reflectance coating includes a first film stack with a first final cap layer and a second film stack atop the first final cap layer and having a second final cap layer, wherein the first cap layer is an internal cap layer and the second cap layer is an external cap layer, with each cap layer having been processed to have reduced surface roughness.

FIG. 6 is similar to FIG. 5C and shows an example DUV mirror 10 wherein the reflectance coating 50 includes a first film stack 100A and final cap layer 120AF atop the first stack 100A, with final cap layer 120AF formed in the manner described above and having an upper surface 122AF with an amount of surface roughness $SR_{AF}$. The reflectance coating 50 also includes a second film stack 100B formed atop first film stack 100A and a final cap layer 120B top the second film stack. The final cap layer 120BF is also formed in the manner described above and has a surface roughness $SR_{BF}$.

Thus, the example reflectance coating 50 of FIG. 6 includes an internal final upper surface 122AF as well as an external final upper surface 122BF that interfaces with the ambient environment, e.g., air, vacuum, inert gas, etc. More generally, reflectance coating 50 can include at least one internal final cap layer and one external final cap layer. In an example, reflectance coating 50 can include a single final cap layer 120F that in an example is either an internal or an external final cap layer. A benefit of having at least one internal final cap layer in addition to an external final cap layer is that it further reduces the amount of optical loss due to scattering by surface roughness at the interfaces between the internal dielectric layers 102 and 104.

Experimental Results

In one experiment, an example mirror 10 was formed with a reflectance coating 50 designed to operate at a DUV wavelength $\lambda 0=193$ nm. The reflectance coating 50 was formed using a vacuum-based deposition process in a vacuum coater. The reflectance coating 50 included a first "oxide" stack 100A immediately adjacent the substrate with multiple periods of $SiO2$ and $Al2O3$ layers 102A and 104A, respectively. The reflectance coating also had a "fluoride" stack 100B atop the oxide stack 100A. The fluoride stack had multiple periods of layers 102B and 104B of low-index and high-index fluoride materials, respectively. The fluoride stack 100B was capped with a half-wave F—$SiO2$ capping layer. The upper surface 122 of cap layer 120 had an initial surface roughness SR0 of 1.691 nm RMS as measured using an atomic force microscope (AFM).

The mirror 10 was then re-loaded into the vacuum coater and a sacrificial layer 220 of F—SiO2 having a thickness THS of 5 nm was deposited on upper surface 122 of cap layer 120 using a reversed mask and a plasma-ion assisted deposition process. The sacrificial layer 220 was then removed using a plasma etch process with a bias voltage of 110 V, a coil current of 1.6 A and a duration of 11 minutes. The plasma included oxygen radials O* and Ar gas. The 11 min plasma treatment removed sacrificial layer 220. Since the process only included one iteration of addition and removal of sacrificial layer 220, the processed upper surface 122P of cap layer 120 was also the final upper surface 122F and was measured using an AFM and found to have a final amount of surface roughness SRF of 1.533 nm RMS, which is a reduction in surface roughness of 0.158 nm RMS, or about 9%.

Figure 7:
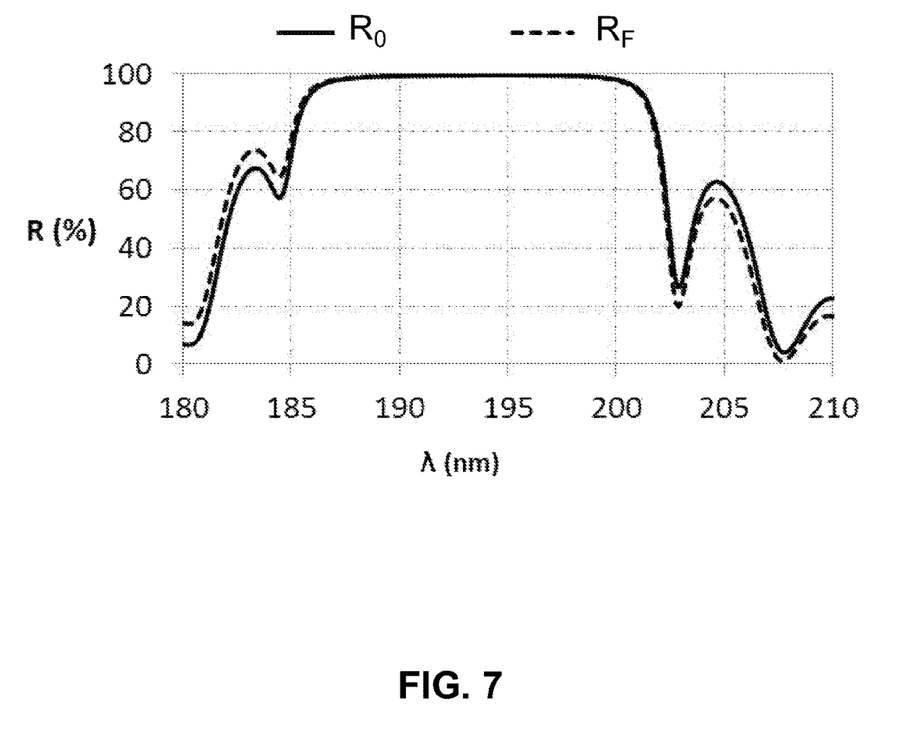
FIG. 7 is a plot of the reflectance R (%) versus wavelength $\lambda$ (nm) showing curves of the initial reflectance $R_0$ and the final reflectance $R_F$ of an example reflectance coating having a single external cap layer that has undergone a single iteration of addition and removal of the sacrificial layer to reduce the surface roughness of the upper surface of the cap layer.

FIG. 7 is a plot of the reflectance R (%) as a function of wavelength λ (nm) and shows a curve for the initial reflectance R0 and a curve RF for the final reflectance after processing upper surface 122 of cap layer 120. The RF curve substantially overlaps with the R0 curve. As can be seen from the two curves, the above-described process for reducing surface roughness does not shift the center wavelength of the reflectance and only slightly impacts the side bands, with suppression of the reflectance on the left side of the central peak and an increase of reflectance on the right side of the central peak. In fact, the method of reducing the surface roughness moves the reflectance curve closer to its ideal (theoretical) shape that assumes no surface roughness reduction in reflectance.

Additional experiments were conducted on an example mirror 10 with a reflectance coating 50 the same as described in the above example but that had a cap layer 120 with a thickness THC of 30 nm and an initial surface roughness SR0 of 2.790 nm RMS. A sacrificial layer 220 with a thickness THS of 5 nm was added and then removed from cap layer 120 six times, i.e., six processing cycles or iteration were performed, using the same plasma-based removal process as described above. The final surface roughness SRF of final upper surface 122F of the final cap layer 120F was measured via AFM to be 1.646 nm RMS, which is a reduction in surface roughness of 1.114 nm RMS or about 41%. In addition, the six plasma-etch treatment cycles were found to bring reflectance spectral curve substantially back to its ideal shape in the both of the side bands. The reduction in the surface roughness resulted in about a 2× reduction in scatter loss at the DUV wavelength λ0 of 193 nm.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A method of improving a reflectance of a deep ultraviolet (DUV) reflectance coating, comprising:
    a) forming the reflectance coating on a substrate, the reflectance coating including a film stack comprising multiple dielectric layers, including an uppermost dielectric layer;
    b) adding to the uppermost dielectric layer of the film stack a dielectric cap layer having a thickness and having an upper surface with an initial root-mean-square (RMS) amount of surface roughness $SR_O$, and wherein the cap layer is deposited at a first deposition rate;
    c) adding a sacrificial layer to the upper surface of the cap layer, wherein the sacrificial layer is made of the same material as the dielectric cap layer, and wherein the sacrificial layer is deposited at a second deposition rate; and
    d) etching the sacrificial layer down to the cap layer without substantially reducing the thickness of the cap layer so that the upper surface of the cap layer has a final RMS amount of surface roughness $SR_F$ that is less than the initial amount of surface roughness $SR_O$.

2. The method according to claim 1, wherein the material that makes up the dielectric cap layer and the sacrificial layer comprises either silicon dioxide or doped silicon dioxide.

3. The method according to claim 1, wherein the material that makes up the dielectric cap layer and the sacrificial layer consists of either silicon dioxide or doped silicon dioxide.

4. The method according to claim 1, further comprising:
    e) repeating acts c) and d) so that the final RMS amount of surface roughness SRF is at least 10% smaller than the initial RMS amount of surface roughness $SR_O$.

5. The method according to claim 1, further comprising:
    e) repeating acts c) and d) so that the final RMS amount of surface roughness SRF is at least 20% smaller than the initial RMS amount of surface roughness $SR_O$.

6. The method according to claim 1, further comprising:
    e) repeating acts c) and d) between 5 and 10 times.

7. A method of improving a reflectance of a deep ultraviolet (DUV) reflectance coating, comprising:
    a) forming the reflectance coating on a substrate, the reflectance coating including a film stack comprising multiple dielectric layers, including an uppermost dielectric layer;
    b) adding to the uppermost dielectric layer of the film stack a cap layer comprising silicon dioxide ($SiO_2$), wherein the cap layer has a thickness and wherein the cap layer has an upper surface with an initial root-mean-square (RMS) amount of surface roughness $SR_O$, and wherein the cap layer is deposited at a first deposition rate;
    c) adding a sacrificial layer to the upper surface of the cap layer, wherein the sacrificial layer comprises $SiO_2$, and wherein the sacrificial layer is deposited at a second deposition rate; and
    d) etching the sacrificial layer down to the cap layer without substantially reducing the thickness of the cap layer so that the upper surface of the cap layer has a final RMS amount of surface roughness $SR_F$ that is less than the initial amount of surface roughness $SR_O$.

8. The method according to claim 7, further comprising:
    e) repeating acts c) and d) so that the final RMS amount of surface roughness SRF is at least 10% smaller than the initial RMS amount of surface roughness $SR_O$.

9. The method according to claim 7, further comprising:
    e) repeating acts c) and d) so that the final RMS amount of surface roughness $SR_F$ is at least 20% smaller than the initial RMS amount of surface roughness $SR_O$.

10. The method according to claim 7, further comprising:
    e) repeating acts c) and d) between 5 and 10 times.

11. The method according to claim 7, wherein the etching comprises plasma etching with a plasma that contains oxygen radicals.

12. The method according to claim 7, wherein the cap layer and the sacrificial layer each comprise either $SiO_2$ or doped $SiO_2$.

13. The method according to claim 7, wherein the cap layer and the sacrificial layer each consists of either $SiO_2$ or doped $SiO_2$.

14. The method according to claim 7, wherein one or more of the dielectric layers of the multiple dielectric layers includes fluoride.

15. The method according to claim 7, wherein the multiple dielectric layers are made of materials layers selected from the group of materials consisting of: aluminum fluoride, gadolinium fluoride, magnesium fluoride, lanthanum fluoride, silicon dioxide and aluminum oxide.

16. The method according to claim 7, wherein the film stack resides upon a base film stack that resides immediately adjacent the substrate and the film stack comprises alternating layers of aluminum oxide and silicon dioxide.

17. The method according to claim 7, wherein the thickness of the silicon dioxide cap layer is in the range from 55 nm to 70 nm.

18. The method according to claim 7, wherein the substrate comprises silicon dioxide.

19. The method according to claim 7, wherein the cap layer is deposited at the first deposition rate and the sacrificial layer is deposited at the second deposition rate that is slower than the first deposition rate by at least 5%.

20. The method according to claim 19, wherein the first deposition rate is 0.25 nm/s and the second deposition rate is 0.15 nm/s.

21. The method according to claim 7, wherein the reflectance coating after performing the act b) has a reflectance R<99% and wherein the reflectance coating after performing the acts c) and d) one or more times is R>99%.

22. The method according to claim 7, wherein the reflectance of the reflectance coating is optimized over a wavelength band that includes at least one of the following wavelengths: 193 nm, 213 nm and 266 nm.

23. A method of improving a reflectance of a deep ultraviolet (DUV) reflectance coating, comprising:
   a) forming the reflectance coating on a substrate, the reflectance coating including a film stack comprising multiple dielectric layers, including an uppermost layer;
   b) adding to the uppermost layer of the film stack a cap layer consisting of either silicon dioxide or doped silicon dioxide, wherein the cap layer has a thickness and has an upper surface with an initial root-mean-square (RMS) amount of surface roughness $SR_0$, and wherein the cap layer is deposited at a first deposition rate;
   c) adding a sacrificial layer to the upper surface of the cap layer, wherein the sacrificial layer consists of the same material as the cap layer, and wherein the sacrificial layer is deposited at a second deposition rate;
   d) plasma etching the sacrificial layer with a plasma containing oxygen radicals down to the cap layer; and
   e) performing acts c) and d) multiple times until the upper surface of the cap layer has a final RMS amount of surface roughness SRF that is less than the initial RMS amount of surface roughness SRF by at least 10%.

24. The method according to claim 23, wherein act e) includes repeating acts c) and d) between 2 and 10 times.

25. The method according to claim 23, wherein the cap layer is deposited at the first deposition rate and the sacrificial layer is deposited at the second deposition rate that is slower than the first deposition rate by at least 5%.

26. The method according to claim 23, wherein the multiple dielectric layers are made of materials selected from the group of materials consisting of: aluminum fluoride, gadolinium fluoride, magnesium fluoride, lanthanum fluoride, silicon dioxide and aluminum oxide.

27. The method according to claim 23, wherein the reflectance coating after performing the act b) has a reflectance R<99% and wherein the reflectance coating after performing act e) is R>99%.

* * * * *

UNITED STATES PATENT AND TRADEMARK OFFICE
CERTIFICATE OF CORRECTION

PATENT NO.         : 10,345,494 B2                                    Page 1 of 1
APPLICATION NO.    : 15/649736
DATED              : July 9, 2019
INVENTOR(S)        : Michael Joseph D'Iallo et al.

It is certified that error appears in the above-identified patent and that said Letters Patent is hereby corrected as shown below:

In the Claims

In Column 10, Line 24, Claim 4, delete "SRF" and insert -- $SR_F$ --, therefor.

In Column 10, Line 28, Claim 5, delete "SRF" and insert -- $SR_F$ --, therefor.

In Column 10, Line 57, Claim 8, delete "SRF" and insert -- $SR_F$ --, therefor.

In Column 12, Line 21, Claim 23, delete "SRF" and insert -- $SR_F$ --, therefor.

In Column 12, Line 22, Claim 23, delete "SRF" and insert -- $SR_F$ --, therefor.

Signed and Sealed this
Eighteenth Day of February, 2020

Andrei Iancu
*Director of the United States Patent and Trademark Office*